(12) United States Patent
Wen et al.

(10) Patent No.: US 7,951,417 B1
(45) Date of Patent: May 31, 2011

(54) BIO-BASED ADHESIVE MATERIAL FOR ROOF SHINGLES

(75) Inventors: Ben Wen, Horseheads, NY (US); Jessica P. Zhang, Horseheads, NY (US)

(73) Assignee: United Environment & Energy LLC, Horseheads, NY (US)

( * ) Notice: Subject to any disclaimer, the term of this patent is extended or adjusted under 35 U.S.C. 154(b) by 0 days.

(21) Appl. No.: 12/754,236

(22) Filed: Apr. 5, 2010

(51) Int. Cl.
 *B05D 1/12* (2006.01)
 *B05D 1/36* (2006.01)
(52) U.S. Cl. .................................. 427/186; 427/188
(58) Field of Classification Search .................. 427/186, 427/188
 See application file for complete search history.

(56) References Cited

U.S. PATENT DOCUMENTS

| | | | | |
|---|---|---|---|---|
| 2,673,814 A | * | 3/1954 | MacLaren | 106/269 |
| 2,759,840 A | * | 8/1956 | Crews et al. | 106/269 |
| 4,055,453 A | * | 10/1977 | Tajima et al. | 156/279 |
| 6,495,074 B1 | * | 12/2002 | Carr | 264/36.18 |
| 2007/0087166 A1 | | 4/2007 | Lee et al. | |
| 2008/0245269 A1 | * | 10/2008 | Forth et al. | 106/244 |

* cited by examiner

*Primary Examiner* — Frederick J Parker
(74) *Attorney, Agent, or Firm* — Louis Ventre, Jr.

(57) ABSTRACT

An adhesive product and method of making the product replaces asphalt in the manufacture of roofing shingles. The method comprises steps of forming a mixture of oil comprising fatty acids and a powdered catalyst operable to catalyze the polymerization of the oil; maintaining the oil to powdered catalyst weight ratio in the mixture between 1 to 0.01 and 1 to 4.9; heating the mixture to a reaction temperature greater than 100 degrees Centigrade; maintaining the reaction temperature for at least five minutes; and, injecting air into the mixture while maintaining the reaction temperature. In making a roofing shingle, the method includes additional steps of: applying the heated mixture to a fiberglass mat sheet from an upstream roll to form a tacky coated strip; and, adding a layer of granules to the tacky coated strip. The adhesive material of this method comprises polymerized oil and the powdered catalyst.

12 Claims, 1 Drawing Sheet

| A method of making an adhesive material to replace asphalt in the manufacture of roof shingles, the method comprising the steps of: | 100 |
|---|---|
| forming a mixture by combining oil comprising fatty acids; and, a powdered catalyst operable to catalyze the polymerization of the oil | 105 |
| maintaining the oil to powdered catalyst weight ratio in the mixture between 1 to 0.01 and 1 to 4.9 | 110 |
| heating the mixture to a reaction temperature greater than 100 degrees Centigrade | 115 |
| maintaining the reaction temperature for a period of time longer than about five minutes | 120 |
| injecting air into the mixture while maintaining the reaction temperature | 125 |
| obtaining waste cooking oil for use as the oil in the mixture | 130 |
| selecting the powdered catalyst from the group consisting of: fly ash; sand; cement; limestone; and, dolomite | 132 |
| obtaining the oil from a source selected from the group consisting of: a vegetable, a plant, an alga, and an animal fat | 135 |
| the reaction temperature is within a range of between about 130 degrees Centigrade and about 230 degrees Centigrade | 140 |
| the period of time for maintaining the reaction temperature comprises about 0.5 hours to about 5 hours | 145 |
| maintaining the oil to powdered catalyst weight ratio between 1 to 0.5 and 1 to 3 | 150 |
| uniformly distributing the air in the mixture; and, maintaining an air to oil ratio in the mixture within a range of 0.02 to 2.0 liters air per gram of oil | 155 |
| applying the heated mixture to a fiberglass mat sheet from an upstream roll to form a tacky coated strip; and, adding a layer of granules to the tacky coated strip | 160 |
| stirring the mixture while maintaining the reaction temperature | 165 |
| injecting air into the mixture is performed by bubbling air into the mixture | 170 |
| injecting air into the mixture is performed by rotating the mixture in a rotary drum | 175 |
| adhesive material derived from the method comprising: polymerized oil; and, the powdered catalyst | 180 |

BIO-BASED ADHESIVE MATERIAL FOR ROOF SHINGLES

TECHNICAL FIELD

In the field of stock material, a method of making a new composition for roofing shingle manufacture is disclosed. The new composition is an asphalt substitute. The new composition is a bio-based adhesive when in use as a roofing shingle has a coating structure made up of granules of matter having no regular design or pattern.

BACKGROUND ART

New uses of high volume wastes, such as fly-ash and cooking oil, can serve important environmental goals and at the same time provide useful products in modern society. This invention accomplishes this goal in providing a durable roofing shingle derived from waste cooking oil and a powdered catalyst, which is preferably fly ash from coal-fueled power plants.

Roofing shingles provide a weatherproof covering for a building. Singles are typically be made from asphalt, but synthetic materials are also used. The synthetic materials typically include a polymer, glass fibers, or a rubber-like component. Some alternative roofing materials comprise copper, tin, thatch, wooden shakes, slates, and even tiles of various forms. No existing roofing shingles, however, comprise any component derived from fatty acids typically found in cooking oils.

Asphalt for making asphalt shingles is manufactured from a bituminous material or petroleum, which provides a shingle highly impervious to rain. Bituminous material and petroleum do not contain fatty acids as used in the present invention.

Asphalt shingles typically include an outer layer of mineral granules to improve the weather surface and shield the asphalt coating from the sun's rays. The coating also adds color to the final product, and provides additional fire resistance.

SUMMARY OF INVENTION

An adhesive product and method of making the adhesive product replaces asphalt in the manufacture of roofing shingles. The method comprises the steps of combining oil having fatty acids and a powdered catalyst, which is preferably fly ash resulting from burning coal to form a mixture; maintaining the oil to powdered catalyst weight ratio in the mixture between 1 to 0.01 and 1 to 4.9; heating the mixture to a reaction temperature greater than 100 degrees Centigrade; maintaining the reaction temperature for a period of time longer than about five minutes; and, injecting air into the mixture while maintaining the reaction temperature.

The method may include the step of obtaining waste cooking oil for use as the oil in the mixture. Oil having fatty acids may be obtained from various sources. A variety of reaction temperatures are suitable for this process, but the method preferably sets the reaction temperature within a range of between about 130 degrees Centigrade and about 230 degrees Centigrade, which is preferably maintained for period of time between 0.5 hours to 5 hours. Preferably, the method includes a step for stirring the mixture while maintaining the reaction temperature. Additionally, the amounts of oil and powdered catalyst will vary, but preferably the oil to powdered catalyst weight ratio is between 1 to 0.5 and 1 to 3. The method is preferably performed by uniformly distributing the air in the mixture and by maintaining an air to oil ratio in the mixture within a range of 0.02 to 2.0 liters air per gram of oil.

In making a roofing shingle, the method includes additional steps of: applying the heated mixture to a fiberglass mat sheet from an upstream roll to form a tacky coated strip; and, adding a layer of granules to the tacky coated strip. The invention includes this unique adhesive material derived from this method and comprising polymerized oil and the powdered catalyst.

Technical Problem

Approximately 500 million gallons of waste cooking oils are generated annually in the United States. However, waste cooking oils do not have the same properties as asphalt because they are generally in the liquid state and have a low viscosity.

America's coal-fired power plants produce more than 71.1 million tons of fly ash annually, and approximately 60% is disposed of in landfills or surface impoundments.

Solution to Problem

An environmentally friendly and low cost bio-shingle roof product can replace the asphalt used in the traditional asphalt roof shingles. This bio-shingle roof product comprises adhesive material manufactured from a recycled agricultural byproduct, namely waste cooking oils, and from a powdered catalyst, which is preferably recycled coal-fired power plant waste, namely fly ash.

Fly ash contains many metal compounds, such as $Fe_2O_3$ and $CaO$, which are active catalysts for cooking oil polymerization, which partially solves the liquid and viscosity problems.

Fly ash also contains a large amount of silica (30.9-62.8%). The silanol groups on the silica surface of fly ash interact with electronegative portions of the fatty acids to form hydrogen bonds. These features of fly ash, along with its fine particle size, make fly ash an ideal candidate for combining the polymerized oil and fly ash to produce an adhesive material that can be used for bio-shingle manufacture.

Thus, the powdered catalyst is used to catalyze the polymerization of waste cooking oils at certain temperatures. The polymerized oils then interact with the powdered catalyst to produce an adhesive material. Thus, in a preferred embodiment, the powdered catalyst is fly ash, which serves two functions; it is both a catalyst and a main component of the adhesive material.

ADVANTAGEOUS EFFECTS OF INVENTION

A useful product can be made using two waste products: cooking oil and a powdered catalyst, preferably fly ash. Waste cooking oils are available at a relatively low cost. Waste cooking oil is both a renewable resource and a recyclable product. The fly ash is also available at low cost and using it for a manufactured product means less of it can serve as an environmental contaminant while at the same time changing a disposal liability to an asset with value.

This invention includes a novel bio-based renewable asphalt-like adhesive material. This material can replace the asphalt used in the traditional asphalt roof shingles to make environmentally friendly and low cost bio-shingle roof product.

This adhesive material is manufactured using recycled agricultural byproducts, waste cooking oils, and a powdered catalyst, which is preferably recycled coal-fired power plant waste, fly ash. Waste cooking oil is both a renewable resource and a recycled product.

BRIEF DESCRIPTION OF DRAWING

The drawing illustrates preferred embodiments of the invention.

DESCRIPTION OF EMBODIMENTS

In the following description, reference is made to the accompanying drawings, which form a part hereof and which illustrates several embodiments of the present invention. The drawing and the preferred embodiments of the invention are presented with the understanding that the present invention is susceptible of embodiments in many different forms and, therefore, other embodiments may be utilized, and operational changes may be made, without departing from the scope of the present invention. For example, the steps in the method of the invention may be performed in any order that results making or using the bio-based adhesive material for roof shingles.

The drawing shows steps in the preferred methods of making the bio-based adhesive, also referred to herein as an adhesive or an adhesive material, with mandatory steps connected by solid horizontal lines and optional steps shown connected by dashed horizontal lines. A preferred embodiment is a method of making the adhesive material to replace asphalt in the manufacture of roof shingles (100). This method expressly enables manufacture of a bio-based roofing shingle that employs the adhesive material to replace asphalt in the manufacture of roofing shingles.

A first step is forming a mixture by combining oil comprising fatty acids; and, a powdered catalyst operable to catalyze the polymerization of the oil (105)

The oil is preferably waste cooking oil containing double-bond fatty acids and, therefore, an optional step in the method is obtaining waste cooking oil for use as the oil in the mixture (130).

While the recycling benefits in using used cooking oil deliver extra environmental benefits, virgin or unused cooking oil may also be used. Also, other oil comprising fatty acids may be used. Thus, the method optionally includes a step of obtaining the oil from a source selected from the group consisting of: a vegetable, a plant, an alga, and an animal fat (135). These sources are all bio-based and their oils contain fatty acids necessary to implement the invention.

Preferable powdered catalysts are fly ash, sand, cements, limestone, and dolomite. Thus, an optional step is selecting the powdered catalyst from the group consisting of: fly ash; sand; cement; limestone; and, dolomite (132).

Fly ash is a waste product resulting from burning coal, typically in a coal-fired power plant. Fly ash in the mixture catalyzes the polymerization of the oil, preferably waste cooking oils, at certain temperatures. The polymerized oil then interacts with the fly ash to produce the adhesive material. The fly ash serves two functions; it is both a catalyst and a main component of the adhesive material. While fly ash is used as the primary example herein, any of the other powdered catalysts may serve the same functions.

Fly ash by weight in the mixture can be as little as 0.01 times the weight of the oil as high as 4.9 times the weight of the oil. Preferred mixtures employ a ratio by weight of oil to fly ash in a range of about twice as much oil as fly ash to about one-third as much oil as fly ash.

A second step is maintaining the oil to fly ash weight ratio in the mixture between 1 to 0.01 and 1 to 4.9 (110). To accommodate the preferred range, the method optionally includes an additional step of maintaining the oil to fly ash weight ratio between 1 to 0.5 and 1 to 3 (150).

A third step is heating the mixture to a reaction temperature greater than 100 degrees Centigrade (115). The reaction temperature is preferably up to 230 degrees Centigrade. Therefore, an optional limitation on the method is maintaining the reaction temperature within a range of between about 130 degrees Centigrade and about 230 degrees Centigrade (140).

A fourth step is maintaining the reaction temperature for a period of time longer than about five minutes (120). The holding time may vary, but a preferably range for most mixtures will be up to about 5 hours. Therefore, an optional limitation on the method confines the period of time for maintaining the reaction temperature to between about 0.5 hours to about 5 hours (145).

A fifth step is injecting air into the mixture while maintaining the reaction temperature (125). It is also preferable to stir the mixture to promote formation of the adhesive and so an optional additional step is stirring the mixture while maintaining the reaction temperature (165). Thus to address the step of injecting air and to promote stirring, this step is preferably performed by bubbling air into the mixture (170), and/or by rotating the mixture in a rotary drum (175).

Increasing the oxygen in the mixture results in a greater degree of cross-linking of the oil moles and results in better physical properties of the adhesive material. Thus, it is preferable to achieve a uniform distribution of air in the mixture while mixture is maintained at the reaction temperature. It has been found that air quantities can vary by a factor of a 100 or more and still achieve an acceptable adhesive. Acceptable operations may utilize as little as 0.02 liters of air per gram of oil and as much as 2 liters of air per gram of oil. Therefore, additional optional steps include uniformly distributing the air in the mixture and maintaining an air to oil ratio in the mixture within a range of 0.02 to 2.0 liters air per gram of oil (155). Any adverse effects of humidity in the air have been found to be insignificant.

To make a roofing shingle using the adhesive, additional optional steps include applying the heated mixture to a fiberglass mat sheet from an upstream roll to form a tacky coated strip; and, adding a layer of granules to the tacky coated strip (160).

Some, but not all, acceptable alternate powdered catalysts are sand, cement, limestone, and dolomite. In addition to catalyzing oil polymerization, these materials may also reduce the amount of oil needed to make the bio-based adhesive and can enhance the performance of the shingle as fillers.

The invention includes the bio-based adhesive material derived from the method in that it comprises oil containing fatty acids; and, fly ash waste (180). This bio-based adhesive material is a new, renewable bio-based adhesive material that replaces petroleum asphalt used for shingle production. The bio-based adhesive material is in liquid state at high temperature. The hot liquid is preferably applied to a continuous shingle mat to form a tacky coated strip, then a layer of granules is applied on the coated strip. The purpose of the mat is for reinforcement and the granules are to protect the shingles from the sun and for aesthetics. The granule coated sheet is cooled and subsequently cut into individual shingles. After cooling, the bio-based adhesive material becomes solid and is water proof.

The above-described embodiments including the drawing are examples of the invention and merely provide illustrations of the invention. Other embodiments will be obvious to those skilled in the art. Thus, the scope of the invention is determined by the appended claims and their legal equivalents rather than by the examples given.

INDUSTRIAL APPLICABILITY

The invention has application to the building and roofing industries.

What is claimed is:

1. A method of making an adhesive material to replace asphalt in the manufacture of roof shingles, the method comprising the steps of:
    forming a mixture by combining:
        oil comprising fatty acids; and
        a powdered catalyst operable to catalyze the polymerization of the oil;
    maintaining the oil to powdered catalyst weight ratio in the mixture between 1 to 0.01 and 1 to 4.9;
    polymerizing the oil by:
        heating the mixture to a reaction temperature greater than 100 degrees Centigrade; and
        maintaining the reaction temperature for a period of time longer than about five minutes; and
    injecting air into the mixture while maintaining the reaction temperature.

2. The method of claim 1, further comprising the steps of:
    obtaining waste cooking oil; and
    using the waste cooking oil as the oil in the mixture.

3. The method of claim 1, wherein the powdered catalyst is selected from the group consisting of: fly ash; sand; cement; limestone; and dolomite.

4. The method of claim 1, further comprising the step of obtaining the oil from a source selected from the group consisting of: a plant, an alga, and an animal fat.

5. The method of claim 1, wherein the reaction temperature is within a range of between about 130 degrees Centigrade and about 230 degrees Centigrade.

6. The method of claim 1, wherein the period of time for maintaining the reaction temperature comprises about 0.5 hours to about 5 hours.

7. The method of claim 1, further comprising the step of maintaining the oil to powdered catalyst weight ratio between 1 to 0.5 and 1 to 3.

8. The method of claim 1, further comprising the steps of:
    uniformly distributing the air in the mixture; and
    maintaining an air to oil ratio in the mixture within a range of 0.02 to 2.0 liters air per gram of oil.

9. The method of claim 1, wherein after the step of injecting air, the method further comprises the steps of:
    applying the mixture to a fiberglass mat sheet from an upstream roll to form a tacky coated strip; and
    adding a layer of granules to the tacky coated strip.

10. The method of claim 1, further comprising the step of stirring the mixture while maintaining the reaction temperature.

11. The method of claim 1, wherein the step of injecting air into the mixture is performed by bubbling air into the mixture.

12. The method of claim 1, wherein the step of injecting air into the mixture is performed by rotating the mixture in a rotary drum.

* * * * *